United States Patent [19]

Chu

[11] B 4,001,164
[45] Jan. 4, 1977

[54] FAST DRYING INK

[75] Inventor: Victor Fu Hua Chu, Wilmington, Del.

[73] Assignee: E. I. Du Pont de Nemours and Company, Wilmington, Del.

[22] Filed: July 2, 1975

[21] Appl. No.: 592,658

[44] Published under the second Trial Voluntary Protest Program on March 23, 1976 as document No. B 592,658.

Related U.S. Application Data

[63] Continuation-in-part of Ser. No. 537,597, Dec. 30, 1974, abandoned, and a continuation-in-part of Ser. No. 324,825, Jan. 18, 1973, abandoned.

[52] U.S. Cl. .................. 260/31.8 N; 106/22; 260/31.8 R; 260/31.8 XA; 260/31.8 Z
[51] Int. Cl.² .................. C08K 5/11; C08K 5/12
[58] Field of Search .......... 260/40 R, 37 N, 31.8 N, 260/31.8 XA, 31.8 M, 31.8 Z, 31.8 R

[56] References Cited

UNITED STATES PATENTS

| | | | |
|---|---|---|---|
| 2,937,153 | 5/1960 | Rasmussen | 260/31.8 M |
| 3,257,261 | 6/1966 | Hochberg | 260/31.8 M |
| 3,471,428 | 10/1969 | Hodgson | 260/31.8 R |
| 3,471,439 | 10/1969 | Bixler | 260/41 |
| 3,523,984 | 8/1970 | Clas | 260/31.8 R |
| 3,644,267 | 2/1972 | Jackson | 260/31.8 M |
| 3,684,771 | 8/1972 | Braun | 260/37 N |
| 3,704,255 | 11/1972 | Braun | 260/404.8 |
| 3,775,327 | 11/1973 | Thompson | 260/33.4 F |
| 3,788,996 | 1/1974 | Thompson | 260/34.2 |

FOREIGN PATENTS OR APPLICATIONS 767,376 11/1971 Belgium

OTHER PUBLICATIONS

Materials and Compounding Ingredients for Rubber, Bill Publications, New York, 1968, pp. 160, 178, 195, 204.

*Primary Examiner*—Paul R. Michl

[57] ABSTRACT

An ink which contains
A. a colorant;
B. a film-forming material represented by the structure

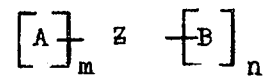

where
A is a segment, non-polymeric or oligomeric, bearing one or more functional groups,
Z is an organic linking radical,
B is an oligomeric or polymeric segment, and
$m$ and $n$ are 1, 2 or 3, the total not exceeding 4; and
C. a non-volatile carrier.

19 Claims, No Drawings

FAST DRYING INK

CROSS-REFERENCES TO RELATED APPLICATIONS

This is a continuation-in-part of application Ser. No. 537,597, filed Dec. 30, 1974, now abandoned, and of application Ser. No. 324,825, filed Jan. 18, 1973, and now abandoned.

BACKGROUND OF THE INVENTION

As is well known, some inks presently used in the printing industry contain organic liquid carriers. The presence of these liquids is a health hazard to pressmen, and the release of the liquids into the air as the ink dries may violate government standards for air quality.

Moreover, some of the present inks, especially those intended for use on offset presses, dry so slowly that it is necessary to dust each impression with a powder, so that when one sheet is placed on top of that which precedes it, the impression is not smeared. This is bothersome and expensive. The powder is also a health hazard to pressmen.

These shortcomings are largely overcome by the inks of this invention. The inks emit hardly any volatiles to pollute the atmosphere because drying proceeds by a different mechanism. Moreover, the drying in most cases is rapid, so the need for drying powders and like tools is minimized. In addition, the inks give better print quality, better tonal ranges and sharper definitions than those obtained with conventional inks.

SUMMARY OF THE INVENTION

The inks contain
A. a colorant;
B. a film-forming material represented by the structure

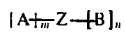  (I)

where
A is a segment, non-polymeric or oligomeric, bearing one or more functional groups,
Z is an organic linking radical (which may be absent),
B is an oligomeric or polymeric segment, and
$m$ and $n$ are 1, 2 or 3, the total not exceeding 4; and
C. a non-volatile carrier.

DETAILED DESCRIPTION OF THE INVENTION

The Colorant

By colorant is meant anything which will give color or shading to the impression the ink makes. Pigments, dyes, toners and lakes can be used. Of these, pigments work best and are therefore preferred. Polar pigments work best of all.

Illustrative of pigments which will work satisfactorily are carbon black, rhodamines, Lithol Rubine, phthalocyanine blue, alkali blue, "Dalamar" Azo yellow[1], benzidine yellows, lead yellows and $TiO_2$.

[1] Sold by E. I. du Pont de Nemours and Company

Mixtures of colorants can be used.

The amount of colorant used will vary with the depth of color desired in the final impression. Ordinarily, this will fall within the range of 15–40%, by weight of the total composition.

The colorant can be omitted entirely, if desired, to form a clear varnish which can be applied over the printed surface to improve gloss and scuff resistance.

The Film-Forming Material

Broadly speaking, the film-forming material can be any formula (I) compound which is compatible with the other components of the ink. "Compatible" in this sense means there is no separation of components in the ink on standing.

In the definition of the film-former (formula I), "non-polymeric" means a moiety with no recurring units. "Oligomeric" means a low member of a polymeric homologous series with a molecular weight (number average) up to about 1,000–2,000.

Illustrative of the classes of formula (I) compounds which can be used as film-formers are

CLASS I

Addition polymers represented by the structure

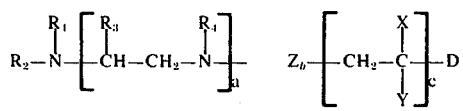

where
$R_1$, $R_2$ and $R_4$ can be hydrogen, alkyl radicals of 1 through 4 carbon atoms, $-CH_2CH_2NH_2$ radicals, or $-CH_2CH_2OH$ radicals;
$R_3$ and X can be hydrogen or alkyl radicals of 1 through 4 carbon atoms;
$Z_b$ can be an organic linking radical;
Y can be hydrogen, an alkyl radical of 1 through 4 carbon atoms, an alkenyl radical of 2 through 6 carbon atoms, $-CN$, halogen, phenyl, $-OR$,

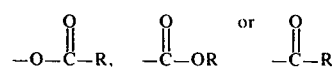

where
R is an alkyl radical of 1 through 18 carbon atoms;
D can be an end group such as hydrogen, alkyl or alkenyl;
$a$ can be a number 1 through 2000;
$b$ can be 0 or 1; and
$c$ can be a number 5 through 5000;
the $c/a$ quotient being greater than 1.

CLASS II

Polyesters represented by the structure

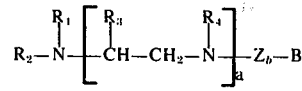

where
$R_1$, $R_2$ and $R_4$ can be hydrogen, alkyl radicals of 1 through 4 carbon atoms, $-CH_2CH_2NH_2$, or $-CH_2CH_2OH$;
$R_3$ can be hydrogen or an alkyl radical of 1 through 4 carbon atoms;
$Z_b$ can be a divalent organic linking radical;
B can be a polyester or copolyester segment, number average molecular weight 500–50,000, preferably 1000–20,000.
$a$ can be a number 1 through 2000; and $b$ is 0 or 1.

CLASS III

Polyesters represented by the structure

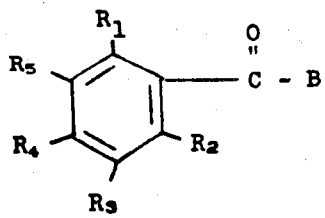

where
$R_1$, $R_2$, $R_3$ and $R_4$ can be hydrogen or —COOH (provided at least one of $R_1$, $R_2$, $R_3$ or $R_4$ is —COOH);
$R_5$ can be $R_6$OOC— or

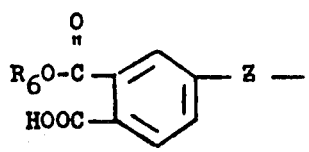

where $R_6$ can be hydrogen,

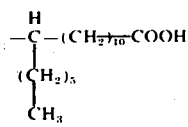

—CH$_2$COOH

—CH$_3$     

—(CH$_2)_{11}$—CH$_3$     

     

—CH$_2$CH$_2$N(CH$_2$CH$_2$OH)$_2$

—CH$_2$CH$_2$SCH$_2$CH$_3$

—CH$_2$CH$_2$CH$_2$COOH

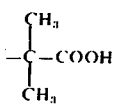     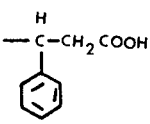

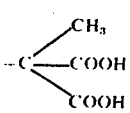     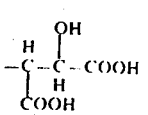

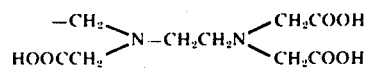

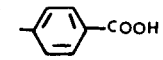

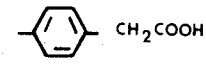

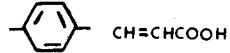

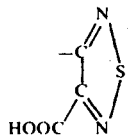

or

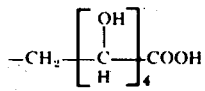

and Z can be

—CH$_2$—, —S—, —SO$_2$— or —O—;
and B can be

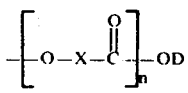

or

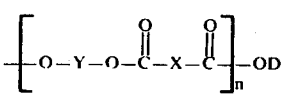

where
X and Y can be phenylene or alkylene radicals of 2 through 18 carbon atoms;
D can be a phenyl or straight- or branched chain alkyl radical of 1 through 18 carbon atoms; and
$n$ is a number 10 through 500.

CLASS IV

Polyesters represented by the structures

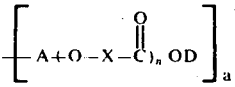

or

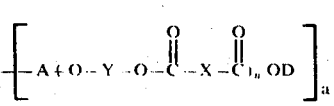

where

R can be the residue from a polyhydroxy compound;
A can be

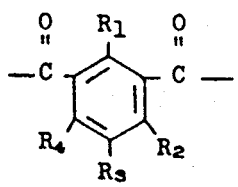

or

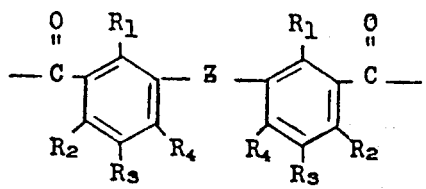

where $R_1$, $R_2$, $R_3$ and $R_4$ can be hydrogen or —COOH; and
Z can be

—$CH_2$—, —S—, —O—, or —$SO_2$—;

X can be phenylene or an alkylene radical of 2 through 18 carbon atoms;

Y can be an alkylene radical of 2 through 18 carbon atoms;

D can be phenyl or a straight- or branched chain alkyl radical of 1 through 18 carbon atoms;

$a$ can be a number 2 through 6; and $n$ can be a number 10 through 500.

CLASS V

Polyesters represented by the structure

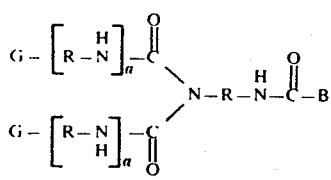

where

G can be the residue of a basic radical which, as an entity before reaction, has a $pk_a$ value of 5–14, or a salt thereof;

R can be alkylene of 2 through 36 carbon atoms, phenylene, tolylene,

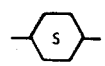

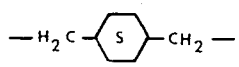

-continued

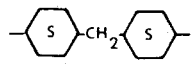

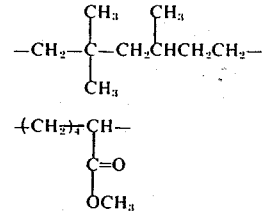

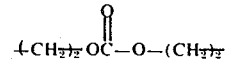

or

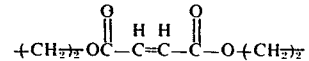

B can be a segment of a polyester or copolyester having a number average molecular weight of 500–50,000, preferably 1000–20,000; and $a$ can be 1, 2 or 3.

CLASS VI

Polyesters represented by the structure

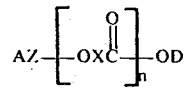

where

A can be a radical bearing at least two hydroxyl groups such as

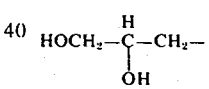   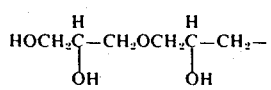

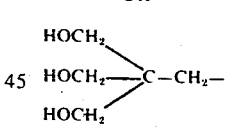   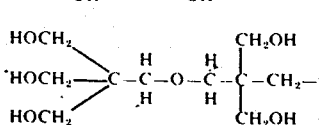

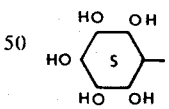   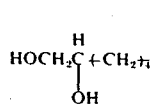

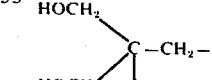   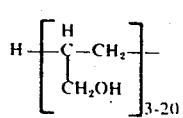

or

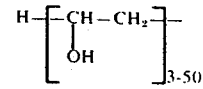

Z can be an organic linking radical;

X can be an alkylene radical of 2 through 18 carbon atoms;

D can be hydrogen or an alkyl radical of 1 through 18 carbon atoms; and n can be a number 10 through 500.

CLASS VII

Materials represented by the structure

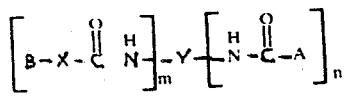

where B can be a polymeric segment of ethylenically unsaturated monomers lacking Zerewitinoff hydrogen atoms (number average molecular weight 500–100,000 preferably 1000–10,000);

X can be the residue of a chain transfer agent;

Y can be the residue of di-, tri- or tetraisocyanate radical;

A can be the residue of an acid radical having a $pk_a$ value of −1 to 6; and m and n can be 1, 2 or 3, the total not exceeding 4. Where n is 2 or 3, only one of A need be as defined.

Materials of Class VII preferred for use are those where A is a mercapto-, hydroxy- or carboxy substituted carboxylic acid radical. Especially preferred are those materials where A is

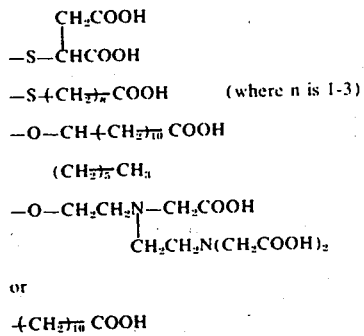

Also preferred are the materials wherein B is a polymeric or copolymeric segment of a. an ester of acrylic acid or methacrylic acid with an alkanol of 1–18 carbon atoms;

b. styrene or acrylonitrile;

c. a vinyl ester derived from an acid of 2 through 18 carbon atoms; or d. a vinyl ether.

Especially preferred are those materials wherein B is 1. a polymeric segment one of whose monomer units is methyl methacrylate, 2. a copolymeric segment of methyl methacrylate and an ester of acrylic acid or methacrylic acid with an alkanol of 2–12 carbon atoms, or 3. a methyl methacrylate/2-ethylhexyl acrylate copolymeric segment.

The Class VII materials also preferred are those wherein X is

—S—R—D where R is alkylene of 1–6 carbon atoms, and

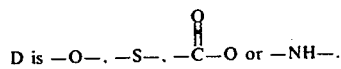

Also preferred are those Class VII materials wherein Y is

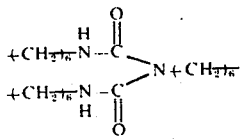

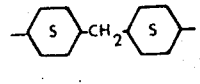

or

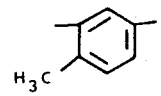

The Class VII materials most preferred for use are those represented by the structure

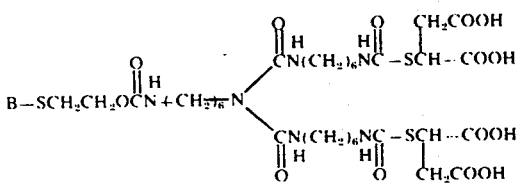

where B is a methyl methacrylate/2-ethylhexyl acrylate copolymeric segment, or a methyl methacrylate/lauryl methacrylate/ethyl acrylate copolymeric segment.

CLASS VIII

Materials represented by the structure

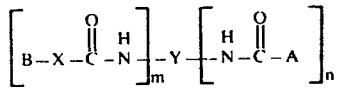

where

B can be a polymeric segment, number average molecular weight of 500–100,000, preferably 1000–10,000, of ethylenically unsaturated monomers lacking Zerewitinoff hydrogen atoms;

X can be the residue of a chain transfer agent;

Y can be the residue of a di-, tri-, or tetraisocyanate radical;

A can be the residue of a mercapto-, hydroxy-, or aminoalkyl alkoxy silane radical; and m and n are 1, 2 or 3 (the total not exceeding 4). Where n is 2 or 3, only one of A need be as defined.

CLASS IX

Materials represented by the structure

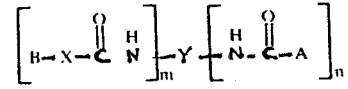

where

B can be a polymeric segment, number average molecular weight 500–100,000, preferably 1000–10,000, of ethylenically unsaturated monomers lacking Zerewitinoff hydrogen atoms;

X can be the residue of a chain transfer agent;

Y can be the residue of a di-, tri-, or tetra-isocyanate radical;

A can be the residue of a basic radical which as an entity before reaction has a $pk_a$ value of 5–14, or a salt thereof, and $m$ and $n$ can be 1, 2 or 3 (the total not exceeding 4). When $n$ is 2 or 3, only one of A need be as defined.

Materials of Class IX preferred for use are those wherein A is an amino-, hydroxy- or mercapto-substituted amine, or amine salt radical. Especially preferred are those materials where A is

[chemical structures: —NH₂; imine/dicyanovinyl amine; 2,4-dinitrophenylamino; acridinyl-NH; guanidinyl; ammonium bromide alcohol; —NHCH₂CH₂N(CH₃)₂]

Also preferred are those materials wherein B is a polymeric segment or copolymeric segment of
  a. an ester of acrylic acid or methacrylic acid with an alkanol of 1–18 carbon atoms;
  b. styrene or acrylonitrile;
  c. a vinyl ester whose ester moiety contains 2–18 carbon atoms; or
  d. a vinyl ether.

Especially preferred are those materials wherein B is
  1. a polymeric segment one of whose monomer units is methyl methacrylate
  2. a copolymeric segment of methyl methacrylate and an' ester of acrylic acid or methacrylic acid with an alkanol of 2–12 carbon atoms,
  3. a methyl methacrylate/isodecyl methacrylate copolymeric segment, or
  4. a styrene/isodecyl methacrylate copolymeric segment.

Materials also preferred are those wherein X is

—S—R—D where R is alkylene of 1–6 carbon atoms, and

D is —O—, —S—, —C(=O)—O— or —NH—.

Also preferred are those materials wherein Y is

[chemical structures: isocyanurate-type; bis(thiophenyl)methane; tolyl]

The material most preferred for use are those represented by the structure

[chemical structure: B—SCH₂CH₂OC(O)N(CH₂)₆N branching to two —CN(CH₂)₆NC—NH₂ groups]

where
B is a methyl methacrylate/isodecyl methacrylate copolymeric segment or
a styrene/isodecyl methacrylate copolymeric segment.

CLASS X

Polyesters represented by the structure $$\left[ A-\overset{O}{\overset{\|}{C}}-\overset{H}{N} \right]_m -Y- \left[ \overset{H}{N}-\overset{O}{\overset{\|}{C}}-B \right]_n$$

where
A is an acid radical having a $pk_a$ value of −1 to 6;
Y is the residue of a di-, tri- or tetraisocyanate radical;
B is a polyester or copolyester segment (number average molecular weight 500–50,000, preferably 1000–10,000); and
$m$ and $n$ are 1, 2 or 3 (the total not exceeding 4). Where $m$ is 2 or 3, only one of A need be as defined.

The Class X material preferred for use is

[chemical structure showing HOOC-CH₂ and HOOC-HC-S-C(O)-N-(CH₂)₆-N-C(O) branching with polyester segment —O(CH₂)₅C(O)—₂₆ —O(CH₂)₅CH₃]

Of these film-forming materials, those of classes VII and IX are most preferred.

Mixtures of film-formers can also be used.

The film-forming materials can be prepared according to the directions in Belgian Patent No. 767,376, U.S. Pat. No. 3,817,944, and U.S. applications Ser. No. 241,401, filed Apr. 5, 1972; and Ser. No. 241,402, filed Apr. 5, 1972.

The amount of formula (I) material used will vary with the nature of the colorant, the nature of the carrier and the amount of residual tackiness desired in the impression made with the ink. In ordinary circumstances, one will use 15–40%, by weight of the total composition, of a formula (I) compound.

A film-forming material of formula (I) can be diluted with up to about 80%, by weight, of one or more other polymeric materials without significantly affecting the properties of the resulting ink or the impressions made with it. This polymeric material must be compatible with the formula (I) compound, "compatible" in this sense meaning that the material does not physically or chemically interfere with the ink's function.

The Carrier

The carrier for the ink can be any liquid which has a vapor pressure of less than about 10 mm. of mercury at 20°C., preferably less than 2 mm., and most of which will separate from the ink by migration into whatever substrate to which the ink is applied.

By "separate by migration" is meant that the carrier is separated from the composition itself by being absorbed into the substrate by capillary action or some other physical phenomenon.

By "most" is meant that nearly all of the carrier is separated from the composition by migration, with only an insignificantly small amount being lost through vaporization or otherwise.

Illustrative of such carriers are the esters of polybasic acids of 1–18 carbon atoms with alkanols of 1–16 carbon atoms. The esters within this group which work best are the higher alkyl esters (6 carbon atoms and up in the alkyl group) of adipic, azelaic, sebacic and phthalic acids.

The carrier most preferred because it minimizes the swelling of offset printing press rollers is diisodecyl adipate.

Mixtures of carriers can also be used.

The amount of carrier used will vary with the nature of the colorant and the film-forming material used. One must take into account the solubility of these materials and the viscosity and general rheological characteristics desired of the ink. In ordinary circumstances from 30% to about 50%, by weight of the ink, of carrier is satisfactory.

How the Compositions Are Made

The carrier is ordinarily selected first since its nature is generally dictated by the kind of paper which is to receive the impression and the type of printing equipment used to make it.

A film-forming material which is soluble in this carrier and which will give the sort of impressions desired is then selected.

Enough of the film-forming material is then dissolved in an organic liquid, such as toluene, to form a solution containing about 70% solids. Normally, the process by which film-formers are prepared yields such a solution. Approximately the required amount of the carrier is then added to this solution and the toluene is distilled off, until a composition containing 30–50%, by weight of the total, of film-former and from 50–70% of carrier is obtained.

Colorant is then added to the resulting vehicle until a colorant/binder weight ratio of 1.0 – 1.9/1 is obtained.

This composition is then thoroughly mixed and deflocculated on a 3-roll mill or similar equipment. The resulting ink can then be adjusted to the proper viscosity by the addition of vehicle or carrier.

About 2%–10%, by weight, of a drying oil such as linseed oil, tung oil or safflower oil or a fatty acid derived from such an oil, can be added to the composition to improve the hardness of the final film. Viscosity modifiers such as mineral oil and conventional plasticizers like octoates and phthalates, can also be added in the usual amounts.

How the Compositions Are Used

The inks of the invention are used in precisely the same manner as conventional inks. No special equipment, handling or techniques are required.

If the final film derived from an ink under normal use conditions is non-crystalline, it must have a glass transition temperature of no more than about −18°C. If the film is crystalline, it must have a melting point of no more than about +18°C. A film is "non-crystalline" for this purpose if there is a distinct break in its glass transition temperature curve; conversely, a film is "crystalline" if it does not produce such a break. Glass transition temperature is determined using a differential scanning calorimeter. Melting point is determined using a Fischer melting block. Samples are obtained by laying down a film of the ink on a glass plate, air-drying it and then stripping the film from the plate.

EXAMPLES

One skilled in the art will be able to practice this invention more readily after referring to the following illustrative examples.

In the examples all parts are by weight.

EXAMPLE 1

A film-forming material was prepared by charging the following to a reaction kettle:

|  | Parts |
| --- | --- |
| Methyl methacrylate | 938 |
| Isodecyl methacrylate | 700 |
| Toluene | 519 |
| 2-Mercaptoethanol | 31.3 |

The charge was stirred and then heated to and held at reflux temperature. To it was then added, over a 110 minute period, a mixture of

|  | Parts |
| --- | --- |
| Isodecyl methacrylate | 238 |
| Toluene | 70 |
| Azobisisobutyronitrile | 3.8 |

A mixture of toluene (75 parts) and azobisisobutyronitrile (1.3 parts) was then added to the reaction mass over a 25 minute period, with stirring, while holding the mass at reflux temperature. Refluxing was maintained for 5 minutes after this addition, and 655 parts of toluene were then added.

150.3 parts of toluene were then distilled from the mass at 120°C. The resulting mixture was cooled to 100°C. and to it were added 260 parts of Desmodur N-75[1] and 1 part of dibutyltindilaurate. The resulting reaction mass was heated to 105°–110°C. and held there for 30 minutes.

[1] Sold by Farbenfabriken Bayer, AG. It has the structural formula $$OCN(CH_2)_6N \begin{matrix} \overset{O}{\underset{\parallel}{C}}NH(CH_2)_6NCO \\ \overset{O}{\underset{\parallel}{C}}NH(CH_2)_6NCO \end{matrix}$$

At the end of this period, ammonia gas was bubbled in until all of the free isocyanate groups in the intermediate product had been reacted, as determined by periodic sampling and analysis.

To 1440 parts of this material were added, with mixing, 1600 parts of diisodecyl adipate. Toluene was then distilled from this mass until a residue (A) of 2550 parts remained.

To 456 parts of this residue were added 304 parts of "Dalamar" Yellow YT 717D[2]

[2] Sold by E. I. du Pont de Nemours and Company

The resulting mixture was twice passed through a 3-roll mill, and to the mixture were then added 183 parts of the residue (A) above. The mixture was again passed through a 3-roll mill.

When used in a lithographic offset press, the resulting ink dried instantly to give sharp, clear impressions with excellent tonal range. There was no observable swelling of the rubber rollers of the press.

EXAMPLE 2

A. A film-forming material was prepared by charging the following to a reaction kettle:

|  | Parts |
|---|---|
| Styrene | 1600 |
| Isodecyl methacrylate | 220 |
| 2-mercaptoethanol | 5 |
| Toluene | 200 |

The charge was heated to reflux temperature, with stirring, and held at that temperature. To it was then added, over a 60 minute period and with stirring, a mixture of

| Isodecyl methacrylate | 90 |
|---|---|
| Azobisisobutyronitrile | 5.3 |
| 2-mercaptoethanol | 44.5 |
| Toluene | 164 |

At the end of this interval, the following mixtures were successively added with stirring, to the reaction mixture held at reflux temperature, each mixture being added over a 60 minute period:

| (1) | Isodecyl methacrylate | 90 |
|---|---|---|
|  | Azobisisobutyronitrile | 5.3 |
|  | 2-mercaptoethanol | 16.1 |
|  | Toluene | 164.0 |
| (2) | 2-mercaptoethanol | 5.9 |
|  | Azobisisobutyronitrile | 5.3 |
|  | Toluene | 164 |
| (3) | Azobisisobutyronitrile | 5.3 |
|  | Toluene | 164 |

B. To 1871.6 parts of the product of (A) were added, with stirring, 519 parts of toluene. This mixture was heated to reflux temperature and held there while 75 parts of toluene were distilled off. The mixture was then cooled to 100°C. and to it was then added, with stirring, a mixture of

| Desmodur N-100 (a polyfunctional isocyanate sold by Mobay Co.) | 265 |
|---|---|
| Dibutyltin dilaurate | 0.27 |

The resulting mixture was then heated to 110°C., held there for 30 minutes, and cooled to 40°C. Ammonia gas was then bubbled into the mixture for 90 minutes.

C. To the film-former produced in (B) were added 1000 parts of diisodecyl adipate, with stirring. This mixture was heated to 150°C. and held there while 906 parts of toluene were distilled off. To the residue were then added 1620 parts of diisodecyl adipate.

D. To 445 parts of (C) were added, with mixing, 178 parts of diisodecyl adipate and 267 parts of Mogul-L (a carbon black sold by Cabot Corp.). This mixture was passed five times through a 3-roll mill.

When used as in Example 1, the resulting ink gave substantially the same results.

EXAMPLE 3

To 20 parts of the ink of Example 2 were added, with mixing, 0.82 part of linseed oil fatty acid and 0.24 part of cobalt naphthenate solution (6% cobalt).

The resulting ink gave impressions harder than those of Example 2, with better oil resistance.

EXAMPLE 4

To 20 parts of the ink of Example 2 were added, with mixing, 0.82 part of tung oil and 0.12 part of cobalt naphthenate solution (6% cobalt).

The resulting ink gave impressions harder than those of Example 2, with faster set time.

I claim:
1. A liquid ink composition of low volatility consisting essentially of
   A. a colorant;
   B. as a film former, 15–40% by weight of the composition of a compound of classes II through X; and
   C. a carrier having a vapor pressure of less than about 10 mm./Hg. at 20°C., and most of which will separate from the composition by migration into the substrate to which the composition is applied, the film derived from the composition under normal use conditions having a melting point of no more than about +18°C. if crystalline or a glass transition temperature of no more than about −18°C. if non-crystalline.
2. The composition of claim 1 wherein the carrier in (C) is an ester of a polybasic acid of 1–18 carbon atoms with an alkanol of 1–16 carbon atoms.
3. The composition of claim 1 wherein the compound in (B) is represented by the structure

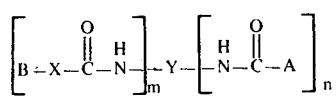

where
B is a polymeric segment of ethylenically unsaturated monomers, lacking Zerewitinoff hydrogen atoms;
X is the residue of a chain transfer agent;
Y is the residue of a di-, tri- or tetraisocyanate radical;
A is an acid radical having a $pk_a$ value of $-1$ to 6; and
$m$ and $n$ are 1, 2 or 3, (the total not exceeding 4), provided that when $n$ is 2 or 3, only one of A need be as defined.

4. The composition of claim 3 wherein (A) is a mercaptohydroxy- or carboxy-substituted carboxylic acid radical.

5. The composition of claim 4 wherein the carboxylic acid radical is

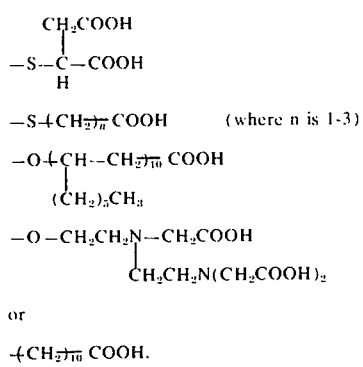

6. The composition of claim 3 wherein (B) is a polymeric segment of
   A. an ester of acrylic acid or methacrylic acid with an alkanol of 1–18 carbon atoms;
   B. styrene or acrylonitrile;
   C. a vinyl ester derived from an acid of 2–18 carbon atoms; or
   D. a vinyl ether.

7. The composition of claim 6 wherein (B) is a copolymeric segment of methyl methacrylate and an ester of acrylic acid or methacrylic acid with an alkanol of 2–12 carbon atoms.

8. The composition of claim 3 wherein the compound in (B) is a polymeric material represented by the structure

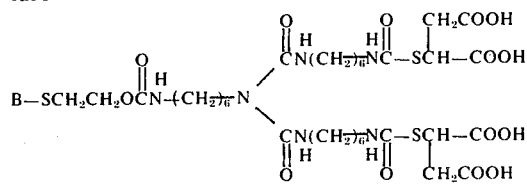

where B is a methyl methacrylate/2-ethylhexyl acrylate copolymeric segment.

9. The composition of claim 3 wherein the compound in (B) is a polymeric material represented by the structure

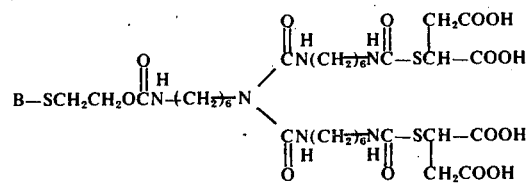

where B is a lauryl methacrylate/ethyl acrylate/methyl methacrylate terpolymer segment.

10. The composition of claim 1 wherein the compound in (B) is a polymeric material represented by the structure

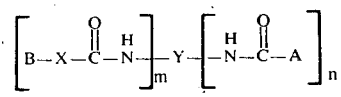

where
B is a polymeric segment of ethylenically unsaturated monomers, lacking Zerewitinoff hydrogen atoms;
X is the residue of a chain transfer agent;
Y is the residue of a di-, tri- or tetraisocyanate radical;
A is the residue of a basic radical which, as an entity before reaction, has a $pk_a$ value of 5–14, or a salt thereof, and
$m$ and $n$ are 1, 2 or 3 (the total not exceeding 4), provided that when $n$ is 2 or 3, only one of A need be as defined.

11. The composition of claim 10 wherein A is an amino-, hydroxy- or mercapto-substituted amine, or amine salt radical.

12. The composition of claim 10 wherein (B) is a polymeric segment or copolymeric segment of
   A. an ester of acrylic acid or methacrylic acid with an alkanol of 1–18 carbon atoms;
   B. styrene or acrylonitrile;
   C. a vinyl ester derived from an acid of 2–18 carbon atoms; or
   D. a vinyl ether.

13. The composition of claim 12 wherein (B) is a copolymeric segment of methyl methacrylate or styrene and an ester of acrylic acid or methacrylic acid with an alkanol of 2–12 carbon atoms.

14. The composition of claim 10 wherein the polymeric material is represented by the structure

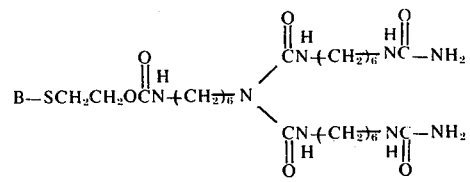

where B is a methyl methacrylate/isodecyl methacrylate copolymeric segment.

15. The composition of claim 10 wherein the polymeric material is represented by the structure

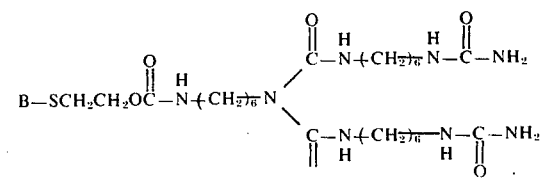

where B is a styrene/isodecyl methacrylate copolymeric segment.

16. The composition of claim 8 wherein (C) is diisodecyl adipate.

17. The composition of claim 9 wherein (C) is diisodecyl adipate.

18. The composition of claim 14 wherein (C) is diisodecyl adipate.

19. The composition of claim 15 wherein (C) is diisodecyl adipate.

* * * * *